Sept. 25, 1962

I. D. YALOM ET AL 3,055,960

THERMOELECTRIC BATTERY

Filed Jan. 6, 1956

INVENTORS
I. D. YALOM
J. C. JEROME

BY

ATTORNEYS 3,055,960

THERMOELECTRIC BATTERY

Isador D. Yalom, Silver Spring, and Joseph C. Jerome, Hyattsville, Md., assignors to the United States of America as represented by the Secretary of the Navy Filed Jan. 6, 1956, Ser. No. 557,814
4 Claims. (Cl. 136—4)
(Granted under Title 35, U.S. Code (1952), sec. 266)

The invention described herein may be manufactured and used by or for the Government of the United States of America for governmental purposes without the payment of any royalties thereon or therefor.

This invention relates to thermoelectric generators of the cell type having a source of heat energy and an associated electrical energy generating unit. More particularly, the invention is concerned with the construction of the cell and the internal arrangement of the heat source and the unit which transforms the heat energy into electrical energy.

Although thermoelectric generators are well known in the art and are satisfactory for many applications, none have been found to be wholly satisfactory for use in an ordnance projectile while in flight inasmuch as deformation of the elements comprising the generator occurs as well as leakage of the electrolyte.

It is a feature of this invention to provide a thermoelectric cell which will operate satisfactorily and reliably as a power supply for proximity fuzes in an ordnance missile.

One object of this invention is to provide a thermoelectric cell which will operate dependably when subjected to centrifugal and acceleration forces of the magnitudes existing in ordnance missiles upon firing and in flight.

Another object of the invention is to provide a thermoelectric cell wherein the optimum use of the available heat energy for the generation of electrical energy is utilized.

A further object of the invention is to provide a thermoelectric cell adaptable to be linked into a chain of cells for generating a desired amount of electrical energy.

A still further object of the invention is to provide a thermoelectric cell adaptable to be formed into a spiral configuration.

Another further object of the invention is to provide a thermoelectric cell simple in construction and small in size.

Other objects and many of the attendant advantages of this invention will be readily appreciated as the same becomes better understood by reference to the following detailed description when considered in connection with the accompanying drawings wherein.

Figures 1, 2, 3, 4, 5:
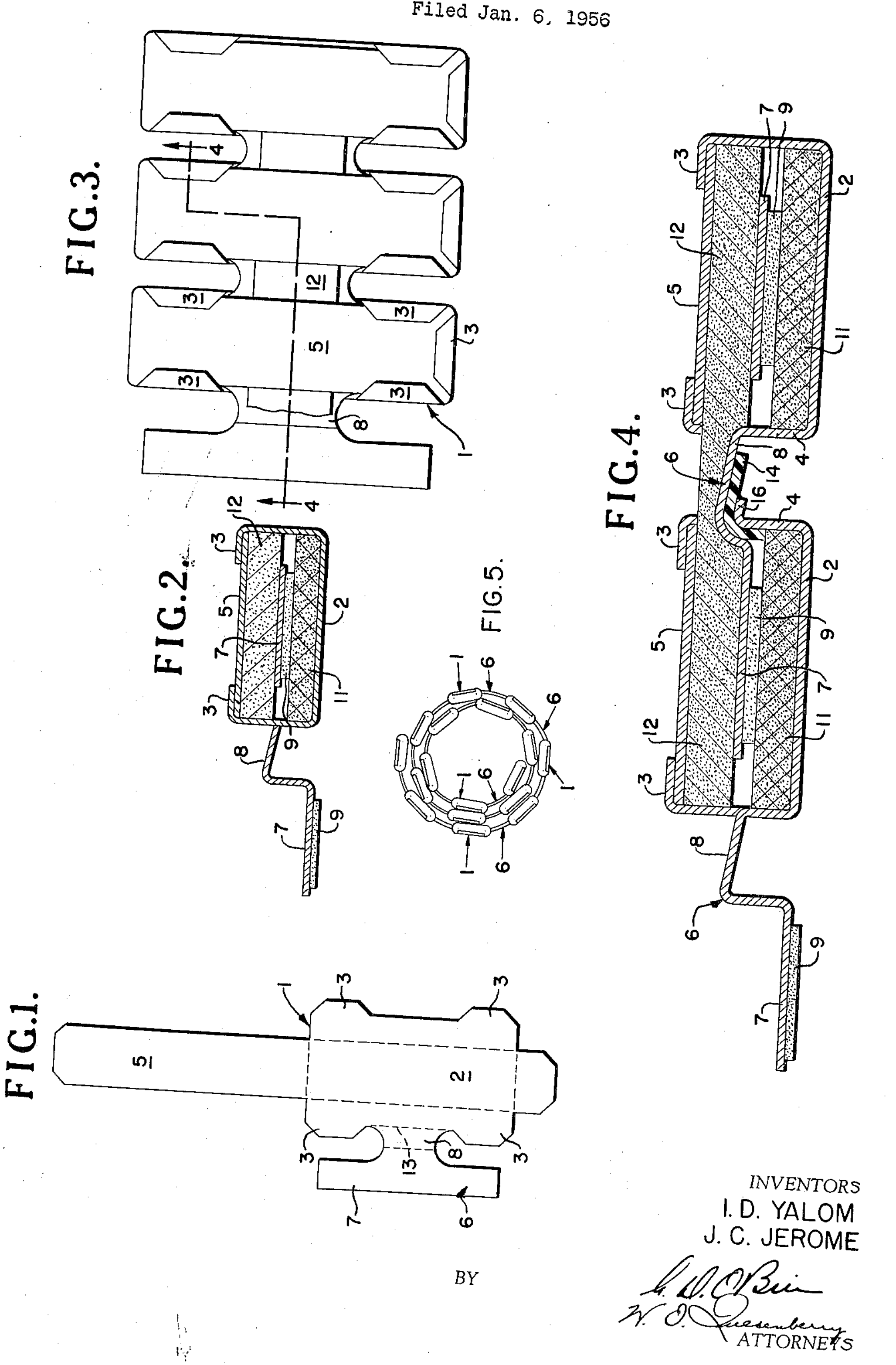
FIG. 1 is a plan view of the cell casing as it appears before being bent into a "cup" shaped casing.
FIG. 2 is a cross sectional view of the assembled cell.
FIG. 3 is a plan view of a linkage of cells according to this invention.
FIG. 4 is an enlarged cross-sectional view taken on line 4—4 of FIG. 3.
FIG. 5 is a top view of a serial linkage of cells according to this invention in a spiral configuration.

Referring more particularly to the drawing wherein like numerals indicate like parts throughout the several views and more particularly to FIG. 1 whereon is shown a cell casing, generally indicated by the numeral 1, which is formed, as by stamping, out of sheet metal such as nickel steel, or, preferably nickel. The casing 1 is bent sharply along the dashed lines to form a cup-shaped casing having a bottom wall 2, side flanges 3, side wall 4, top, or cover, wall 5, and linking tab 6 having an enlarged rectangular portion 7 and neck portion 8 connecting the tab to the cell casing. Deposited on the underside of enlarged portion 7 of the linking tab 6 is a coating of calcium 9.

As shown on FIG. 2 after the casing 1 has been bent into the desired "cup" shape, a rectangular pad, or layer, of electrolyte material 11 is placed therein in contact relationship with bottom wall 2. The electrolyte is of a eutectic mixture, or composition, such as lithium, and potassium chlorides, adapted to be converted from a solid nonconductive state to a liquid conductive state upon application of a predetermined quantity of heat energy. Superposed on the electrolyte pad is a rectangular metallic plate, such as the enlarged portion 7 of interlinking tab 6 having its calcium coated underside 9 in contiguous relationship with the electrolytic pad 11. The combination of calcium deposit 9, electrolyte pad 11, and bottom wall 2 constitutes the cathode, electrolyte, and anode of the electrical energy generating unit of this invention. Superposed on plate 7 is a heat pad 12 composed of a thermite mixture, or other similar exothermic chemical mixture adaptable to generate a large quantity of heat energy upon being activated as by the firing of an explosive device, not shown, such as a primer or detonator, in proximity therewith. A thermite mixture suitable for use is the subject of Patent No. 2,457,860 to O. G. Bennett and Jack Dubin, issued on January 4, 1949. Pad 12 constitutes the heat energy source for actuating the electrical generating unit of the subject invention. The area of pads 11 and 12 is preferably made equivalent to that of bottom wall 2 in order to insure that the pads will be firmly positioned and not displaced when subjected to centrifugal and acceleration forces of the magnitudes existing in an ordnance missile upon firing and while in flight. The area of plate 7 is smaller than that of pads 11 and 12 in order to admit air into the cell casing 1 and thereby allow for the proper operation of the thermoelectric generator. After assemblage of the above mentioned elements of the heat source and electrical generator into the cup-shaped casing, the cover wall 5 is bent and firmly pressed against the elements. The side flanges 3 are thereafter bent over on the outer surface of the cover 5 thereby completely enclosing and firmly securing the above listed elements inside the cell casing.

In addition to the advantage of a firm support for the elements within the cell casing as provided by the above described method of assemblage, an additional advantage is realized by the proximate relationship of the heat source and the electrical generator inasmuch as an optimum transfer of available heat energy is obtainable.

On FIG. 2 is shown a thermoelectric generating cell of the present invention assembled according to the foregoing procedure and having an interlinking tab 6 integrally formed therewith available for disposition in the casing of another similarly constructed thermoelectric generating cell thereby to form a chain of thermoelectric generating cells connected as shown on FIG. 3, into a thermoelectric battery, or power supply, to develop a desired amount of electrical energy. If the thermoelectric battery is to be composed of a single cell assembly, the interlinking tab may be severed from the remainder of the cell casing 1 along the dotted line 13.

Although the cell chain arrangement shown on FIG. 3 is in a strip form, it is to be understood that due to the manner of construction and assembly of the individual cells, the cell chain is as readily adaptable to be formed into a spiral configuration by additional bending of the neck portion 8 of the cell casing 1, as shown in FIG. 5. It is to be further understood that although the heat source pads 12 have been described as of a rectangular shape corresponding to the area of the bottom wall 2, the heat pads are not restricted to this rectangular pattern, and as indicated on the cell chain of FIG. 3, the heat pads may be cut into an H pattern, or a continuous strip of H patterns, and thereby assembled in the cell chain in a continuous strip.

The cross sectional view of FIG. 4 more clearly shows the manner in which the cells are interlinked to form a thermoelectric battery consisting of a chain of thermoelectric cells. As is shown thereon the interlinking tab 6 serves as the conductive connecting element between the cells. In order to prevent the possibility of contact between the tab 6 and side wall 4, thereby shorting out the electrical generating unit, an additional element is incorporated in the cell assembly such as the angle shaped insulating spacer 14 interposed between these elements. To prevent the possibility of puncturing the insulating spacer 14 by the side wall 4 and to more firmly anchor the spacer 14, a bend is formed in side wall 4 to form a flange 16 to conformingly adjoin the spacer 14. FIG. 4 also clearly shows the use of the continuous strip of heat pad 12.

It is to be understood that although the heat pads have been described herein as being formed either of an H-shaped or rectangular pattern so as to be conformingly arranged within the cell casing, the lengthwise dimension of the pad may be lengthened so that the pad protrudes from the cell assembly. This arrangement is especially desirable where the cell chain is wound into a spiral configuration and it is desired to simultaneously activate each cell. To accomplish this, a separate heat pad disc is placed over the spiral configuration and in contact with the exposed portion of the individual cell heat pads. Activation of the disc shaped heat pad would simultaneously activate each individual heat pad.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A thermoelectric cell comprising, a cup-shaped metallic member having an interior concavity forming one electrode of the cell, said member having a conductive tab integral with a sidewall thereof and extending outwardly therefrom adaptable for disposition in the concavity of a like cell, a layer of electrolyte retained within said concavity, said electrolyte being of a material nonconductive when in a solid state and being rendered conductive when transformed into a liquid state upon application of thermal energy thereto, a metallic tab having a calcium coating on one face thereof disposed on said layer forming the other electrode of the cell, a thermite pad superposed on said tab and applying thermal energy to said electrolyte upon initiation of said thermite pad, and a metallic member integral with said cup-shaped member for compactly maintaining said layer, said tab, and said pad within the confines of said interior concavity.

2. A thermoelectric cell adapted to be serially interlinked in a spiral configuration with a series of like cells comprising a cup-shaped conductive member having a concavity and a conductive tab integral with a sidewall thereof and extending outwardly therefrom, a calcium coating disposed on the under face of said tab, a layer of electrolyte disposed within said concavity, said electrolyte being of a material nonconductive when in a solid state and conductive when transformed into a liquid state upon application of thermal energy thereto, a conductive tab from the preceding cell disposed on said layer of electrolyte, a thermite pad disposed on said tab within the concavity for developing suitable thermal energy to transform said electrolyte into the liquid state upon initiation of said thermite pad, a closure plate integral with said member for compactly maintaining said pad, tab, and electrolyte within said concavity, an end portion formed integral with said thermite pad and protruding externally of said cup-shaped member, and a disc-shaped thermite pad disposed on the spiral configuration and contiguous with said end portion for simultaneously initiating said thermoelectric cells.

3. In a thermoelectric cell of claim 2, an insulating spacer disposed on the side wall of said cup-shaped conductive member for maintaining said conductive tab spatially displaced from said member.

4. A thermoelectric cell adapted to be serially interlinked with a series of like cells to form a battery comprising a metallic cup-shaped rectangular container having a conductive tab integral with a sidewall thereof and extending outwardly therefrom, a calcium coating disposed on the under face of said tab, a layer of electrolyte disposed within said container, said electrolyte being of such substance as to be conductively ineffective when in a solid state and conductively effective when in a liquid state, the tab from the preceding cell disposed on said layer of electrolyte, a continuous strip of normally latent exothermic composition disposed on said conductive tab of each serially interlinked cell of the battery for generating sufficient thermal energy to melt the electrolyte in each of the interlinked cells upon initiation thereof, and a closure plate integral with said container for compactly maintaining said electrolyte, tab, and a portion of said strip within said container.

References Cited in the file of this patent

UNITED STATES PATENTS

| | | |
|---|---|---|
| 856,162 | Kitsee | June 4, 1907 |
| 2,081,926 | Gyuris | June 1, 1937 |
| 2,594,879 | Davis | Apr. 29, 1952 |
| 2,631,180 | Robinson | Mar. 10, 1953 |
| 2,707,199 | Ruben | Apr. 26, 1955 |

OTHER REFERENCES

Goodrich et al.: "J. Electrochem. Society," vol. 99, pp. 207C, 208C, August 1952.